(12) United States Patent
Huang et al.

(10) Patent No.: US 10,785,216 B2
(45) Date of Patent: Sep. 22, 2020

(54) METHOD FOR ACCESSING NETWORK BY INTERNET OF THINGS DEVICE, APPARATUS, AND SYSTEM

(71) Applicant: Huawei Technologies Co., Ltd., Shenzhen (CN)

(72) Inventors: Jisong Huang, Shenzhen (CN); Shengen Zhuang, Hangzhou (CN); Zhibin Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 16/116,376

(22) Filed: Aug. 29, 2018

(65) Prior Publication Data

US 2018/0367539 A1 Dec. 20, 2018

Related U.S. Application Data

(63) Continuation of application No. PCT/CN2017/074299, filed on Feb. 21, 2017.

(30) Foreign Application Priority Data

Feb. 29, 2016 (CN) .......................... 2016 1 0112726

(51) Int. Cl.
*H04L 29/06* (2006.01)
*H04W 12/06* (2009.01)
(Continued)

(52) U.S. Cl.
CPC ........ *H04L 63/0846* (2013.01); *H04L 63/083* (2013.01); *H04L 63/10* (2013.01);
(Continued)

(58) Field of Classification Search
CPC ..... H04L 63/0876; H04L 67/12; H04L 63/10; H04L 63/083; H04W 12/06; H04W 84/12; H04W 4/70; H04W 4/08; H04W 12/08

See application file for complete search history.

(56) References Cited

U.S. PATENT DOCUMENTS

| 9,054,961 B1 | 6/2015 | Kim et al. |
| 10,182,304 B2 * | 1/2019 | Vyas ........................ H04W 4/50 |

(Continued)

FOREIGN PATENT DOCUMENTS

| CN | 102882676 A | 1/2013 |
| CN | 103929748 A | 7/2014 |

(Continued)

OTHER PUBLICATIONS

Machine Translation and Abstract of Chinese Publication No. CN102882676, Jan. 16, 2013, 11 pages.

(Continued)

*Primary Examiner* — Amir Mehrmanesh
(74) *Attorney, Agent, or Firm* — Conley Rose, P.C.

(57) ABSTRACT

This application provides a method for accessing a network by an Internet of Things device, an apparatus, and a system, and relates to the field of Internet of Things in order to reduce hardware apparatuses need to be provided for an Internet of Things device, and reduce operation steps of a user when it is ensured that the Internet of Things device securely accesses a network. The method includes sending, by an Internet of Things device, an access request message to an access point, where the access request message includes a universally unique identifier (UUID), a service set identifier (SSID), and a first temporary password (pass_tmp), receiving, by the Internet of Things device, an access response message from the access point, where the access response message includes the SSID and a password, (Continued)

and accessing, by the Internet of Things device, a network using the SSID and the password.

19 Claims, 6 Drawing Sheets

(51) Int. Cl.
| | |
|---|---|
| *H04W 12/08* | (2009.01) |
| *H04W 84/12* | (2009.01) |
| *H04W 4/70* | (2018.01) |
| *H04L 29/08* | (2006.01) |

(52) U.S. Cl.
CPC ....... *H04W 12/06* (2013.01); *H04W 12/0804* (2019.01); *H04L 67/12* (2013.01); *H04W 4/70* (2018.02); *H04W 84/12* (2013.01)

(56) References Cited

U.S. PATENT DOCUMENTS

| | | | |
|---|---|---|---|
| 10,356,092 B2* | 7/2019 | Mattela | H04L 63/0428 |
| 2014/0355523 A1* | 12/2014 | Congdon | H04W 48/12 |
| | | | 370/328 |
| 2015/0223068 A1 | 8/2015 | Thelen et al. | |
| 2015/0327065 A1 | 11/2015 | Mildh et al. | |
| 2017/0195318 A1* | 7/2017 | Liu | H04W 12/06 |
| 2019/0239068 A1* | 8/2019 | Mudulodu | H04L 9/3226 |

FOREIGN PATENT DOCUMENTS

| | | |
|---|---|---|
| CN | 104159226 A | 11/2014 |
| CN | 104363631 A | 2/2015 |
| CN | 104468603 A | 3/2015 |
| CN | 104717225 A | 6/2015 |
| CN | 104854893 A | 8/2015 |
| CN | 105578470 A | 5/2016 |

OTHER PUBLICATIONS

Machine Translation and Abstract of Chinese Publication No. CN103929748, Jul. 16, 2014, 20 pages.
Machine Translation and Abstract of Chinese Publication No. CN104363631, Feb. 18, 2015, 34 pages.
Machine Translation and Abstract of Chinese Publication No. CN104468603, Mar. 25, 2015, 11 pages.
Machine Translation and Abstract of Chinese Publication No. CN104717225, Jun. 17, 2015, 15 pages.
Machine Translation and Abstract of Chinese Publication No. CN105578470, May 11, 2016, 21 pages.
Foreign Communication From a Counterpart Application, Chinese Application No. 201610112726.3, Chinese Office Action dated May 4, 2018, 8 pages.
Foreign Communication From a Counterpart Application, PCT Application No. PCT/CN2017/074299, English Translation of International Search Report dated May 5, 2017, 2 pages.
Foreign Communication From a Counterpart Application, PCT Application No. PCT/CN2017/074299, English Translation of Written Opinion dated May 5, 2017, 7 pages.
Machine Translation and Abstract of Chinese Publication No. CN104159226, Nov. 19, 2014, 28 pages.
Foreign Communication From a Counterpart Application, European Application No. 17759159.1, Extended European Search Report dated Jan. 3, 2019, 10 pages.

* cited by examiner

METHOD FOR ACCESSING NETWORK BY INTERNET OF THINGS DEVICE, APPARATUS, AND SYSTEM

CROSS-REFERENCE TO RELATED APPLICATIONS

This application is a continuation of International Patent Application No. PCT/CN2017/074299 filed on Feb. 21, 2017, which claims priority to Chinese Patent Application No. 201610112726.3 filed on Feb. 29, 2016. The disclosure of the aforementioned applications are incorporated herein by reference in their entireties.

TECHNICAL FIELD

The present disclosure relates to the field of Internet of Things, and in particular, to a method for accessing a network by an Internet of Things device, an apparatus, and a system.

BACKGROUND

Internet of Things (also referred to as IOT) is a network in which devices such as a sensor, a controller, and a household appliance are connected using a communications technology such as a local area network or the Internet to interact with each other or interact with a user such that a connection between a person and an object or a connection between objects is formed, and informatization, remote management control, and intelligence are implemented. Before a person interacts with an object or an object interacts with another object, an Internet of Things device needs to access a network. Therefore, how to make a device conveniently and securely access a network becomes a key technology in the field of Internet of Things.

In other approaches, an Internet of Things device accesses a network mainly in the following manners.

(1) A user enters a service set identifier (SSID) and a password using the Internet of Things device, and the Internet of Things device accesses the network using the SSID and the password. In this way, the Internet of Things device needs to be provided with a touchscreen or a keyboard, and this increases costs and a volume of the Internet of Things device.

(2) A user may use an intelligent device such as a mobile phone or a computer as an access point (also referred to as AP), and notify the Internet of Things device of an SSID and a password using the AP, and the Internet of Things device accesses the network using the SSID and the password. In this way, the Internet of Things device needs to have a WI-FI function, the user has a relatively cumbersome operation, and user experience is relatively poor.

(3) The Internet of Things device requests, in a broadcast manner, a gateway device for accessing the network, and the gateway device notifies the Internet of Things device of an SSID and a password, and the Internet of Things device accesses the network using the SSID and the password. Although the method is relatively easy to implement, there is a security threat that the SSID and the password are easily intercepted by others.

(4) The Internet of Things device is set using a computer. The method is complex and is difficult to deploy on a large scale.

Therefore, when it is ensured that an Internet of Things device securely accesses a network, how to reduce hardware apparatuses that need to be provided for the Internet of Things device, and reduce operation steps of a user in order to provide the user with better user experience is an urgent problem to be resolved.

SUMMARY

An objective of the present disclosure is to provide a method for accessing a network by an Internet of Things device, an apparatus, and a system in order to reduce hardware apparatuses that need to be provided for an Internet of Things device, and reduce operation steps of a user when it is ensured that the Internet of Things device securely accesses a network, and this improves Internet of Things access efficiency to some extent.

The objective and another objective are achieved by features in the independent claims. Further implementations are shown in the dependent claims, the specification, and the accompanying drawings.

According to a first aspect, a method for accessing a network by an Internet of Things device is provided, including pre-configuring an SSID and a first temporary password (pass_tmp) for an Internet of Things device before delivery, and then, when the Internet of Things device needs to access a network, sending, by the Internet of Things device, an access request message to an access point, where the access request message includes a universally unique identifier (UUID), the SSID, and the first pass_tmp, the UUID refers to a number generated on a machine, that is, a sequence number, and is used to ensure that all Internet of Things devices in same time and space are unique, the SSID is used to represent a name of a wireless local area network deployed by the access point, the Internet of Things device may send the access request message to the access point according to the SSID, and the first pass_tmp is used by the access point to send an access response message to the Internet of Things device when that the first pass_tmp is the same as a second pass_tmp that is obtained by the access point from a server according to the UUID, receiving, by the Internet of Things device, the access response message that includes the SSID and a password and that is sent by the access point, and accessing, by the Internet of Things device, a network using the SSID and the password in the received access response message.

The password sent by the access point is a real password, which can be used to access the network.

According to the method for accessing a network by an Internet of Things device provided in the first aspect, an Internet of Things device sends a UUID, an SSID, and a first pass_tmp to an access point, when determining that the first pass_tmp is the same as a second pass_tmp that is obtained by the access point from a server according to the UUID, the access point sends the SSID and a password to the Internet of Things device, and the Internet of Things device accesses a network using the SSID and the password. A user does not need to notify the Internet of Things device of the SSID and the password. Therefore, when it is ensured that the Internet of Things device securely accesses the network, not only hardware apparatuses that need to be provided for the Internet of Things device can be reduced to reduce costs of the Internet of Things device, but also operation steps of the user can be reduced to reduce complexity of a user operation such that the user has better user experience, and Internet of Things access efficiency is improved to some extent.

In a first possible implementation of the first aspect, before the accessing, by the Internet of Things device, a network using the SSID and the password, the method further includes generating, by the Internet of Things device, a first prompt message to prompt a user that the Internet of Things device needs to access the network, and when the user confirms that the Internet of Things device can access the network, obtaining, by the Internet of Things device, a first confirmation message that is from the user and that indicates that the Internet of Things device is allowed to access the network.

In this way, before the Internet of Things device accesses the network using the SSID and the password, confirmation is performed again by the user in order to further ensure that the Internet of Things device securely accesses the network.

According to a second aspect, a method for accessing a network by an Internet of Things device is provided, including obtaining, by an access point, a second pass_tmp from a server according to the UUID after receiving an access request message that includes a UUID, an SSID, and a first pass_tmp and that is sent by an Internet of Things device, when the first pass_tmp is the same as the second pass_tmp, generating, by the access point, a second prompt message to prompt a user that the access point needs to send an access response message to the Internet of Things device, obtaining, by the access point, a second confirmation message indicating that the user allows the access point to send the access response message to the Internet of Things device when the user confirms that the Internet of Things device can access a network, and sending, by the access point, the access response message that includes the SSID and a password to the Internet of Things device, where the access response message may further include the UUID.

In this way, before the access point notifies the Internet of Things device of the SSID and the password that may be used, the Internet of Things device is notified of the SSID and the password that may be used by performing confirmation by the user again in order to further ensure that the Internet of Things device securely accesses the network.

According to the method for accessing a network by an Internet of Things device provided in the second aspect, after receiving a UUID, an SSID, and a first pass_tmp that are sent by an Internet of Things device, an access point obtains a second pass_tmp corresponding to the UUID from a server, when the access point determines that the first pass_tmp is the same as the second pass_tmp, the access point sends the SSID and a password to the Internet of Things device, and the Internet of Things device accesses a network using the SSID and the password. A user does not need to notify the Internet of Things device of the SSID and the password. Therefore, when it is ensured that the Internet of Things device securely accesses the network, not only hardware apparatuses that need to be provided for the Internet of Things device can be reduced to reduce costs of the Internet of Things device, but also operation steps of the user can be reduced to reduce complexity of a user operation such that the user has better user experience, and Internet of Things access efficiency is improved to some extent.

In a first possible implementation of the second aspect, the obtaining, by an access point, a second pass_tmp from a server according to the UUID includes sending, by the access point, a verification message to the server, where the verification message includes the UUID, and receiving, by the access point, a verification response message sent by the server, where the verification response message includes the second pass_tmp, and the server stores at least one UUID and a pass_tmp corresponding to each UUID.

According to a third aspect, a method for accessing a network by an Internet of Things device is provided, including receiving, by a server, a UUID sent by an access point, where the UUID is used to uniquely identify an Internet of Things device, obtaining, by the server, a pass_tmp according to the UUID and a first mapping relationship, where the first mapping relationship includes a mapping from the UUID to the pass_tmp, and sending, by the server, the pass_tmp to the access point.

According to the method for accessing a network by an Internet of Things device provided in the third aspect, after receiving a UUID sent by an access point, a server obtains a mapping from the UUID to a pass_tmp, and sends the pass_tmp to the access point such that when the access point determines that a first pass_tmp is the same as the second pass_tmp, the access point sends an SSID and a password to an Internet of Things device, and the Internet of Things device accesses a network using the SSID and the password. A user does not need to notify the Internet of Things device of the SSID and the password. Therefore, when it is ensured that the Internet of Things device securely accesses the network, not only hardware apparatuses that need to be provided for the Internet of Things device can be reduced to reduce costs of the Internet of Things device, but also operation steps of the user can be reduced to reduce complexity of a user operation such that the user has better user experience, and Internet of Things access efficiency is improved to some extent.

In a first possible implementation of the third aspect, the receiving, by a server, a UUID sent by an access point includes receiving, by the server, a verification message sent by the access point, where the verification message carries the UUID, and the sending, by the server, the pass_tmp to the access point includes sending, by the server, a verification response message to the access point, where the verification response message carries the pass_tmp.

According to a fourth aspect, an Internet of Things device is provided, including a sending unit configured to send a UUID, an SSID, and a first pass_tmp to an access point, a receiving unit configured to receive the SSID and a password that are sent by the access point, and a processing unit configured to access a network using the SSID and the password. For a specific implementation, refer to a behavior function of the Internet of Things device in the method for accessing a network by an Internet of Things device provided in the first aspect.

According to a fifth aspect, an access point is provided, including a receiving unit configured to receive a UUID, an SSID, and a first pass_tmp that are sent by an Internet of Things device, where the receiving unit is further configured to obtain a second pass_tmp from a server according to the UUID, a processing unit configured to generate a prompt message when that the first pass_tmp is the same as the second pass_tmp, and a sending unit configured to send the SSID and a password to the Internet of Things device. For a specific implementation, refer to a behavior function of the access point in the method for accessing a network by an Internet of Things device provided in the second aspect.

According to a sixth aspect, a server is provided, including a receiving unit configured to receive a UUID sent by an access point, a processing unit configured to obtain a pass_tmp according to the UUID and a first mapping relationship, where the first mapping relationship includes a mapping from the UUID to the pass_tmp, and a sending unit configured to send the pass_tmp to the access point. For a specific implementation, refer to a behavior function of the server in the method for accessing a network by an Internet of Things device provided in the third aspect.

It should be noted that the function modules described in the fourth aspect, the fifth aspect, and the sixth aspect may be implemented by hardware, or may be implemented by hardware executing corresponding software. The hardware or software includes one or more modules corresponding to the function modules. For example, a communications interface is configured to implement a function of the receiving unit and the sending unit, and a processor is configured to implement a function of the processing unit. The processor, the communications interface, and a memory are connected and complete mutual communication using a bus. Further, reference may be made to a behavior function of the Internet of Things device in the method for accessing a network by an Internet of Things device provided in the first aspect, a behavior function of the access point in the method for accessing a network by an Internet of Things device provided in the second aspect, and a behavior function of the server in the method for accessing a network by an Internet of Things device provided in the third aspect.

In the present disclosure, names of the Internet of Things device and the access point constitute no limitation on the device. In actual implementation, these devices may appear with other names provided that functions of all the devices are similar to those in the present disclosure, and fall within the scope of the claims of present disclosure and equivalent technologies of the claims.

These aspects or another aspect of the present disclosure are or is clearer and more understandable in description in the following embodiments.

BRIEF DESCRIPTION OF DRAWINGS

To describe the technical solutions in embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes technical solutions in embodiments of the present disclosure with reference to the accompanying drawings in the embodiments of the present disclosure.

A basic principle of the present disclosure includes that when a user needs to notify an Internet of Things device of an SSID and a password, and the Internet of Things device can access a network only using the SSID and the password, causing a relatively large volume and relatively high costs of the Internet of Things device and a relatively complex user operation, in the present disclosure, an Internet of Things device sends a UUID, an SSID, and a first pass_tmp to an access point, when the access point determines that the first pass_tmp is the same as a second pass_tmp that is obtained by the access point from a server according to the UUID, the Internet of Things device receives the SSID and a password that are sent by the access point, and the Internet of Things device accesses a network using the SSID and the password. A user does not need to notify the Internet of Things device of the SSID and the password. Therefore, when it is ensured that the Internet of Things device securely accesses the network, not only hardware apparatuses that need to be provided for the Internet of Things device can be reduced to reduce costs of the Internet of Things device, but also operation steps of the user can be reduced to reduce complexity of a user operation such that the user has better user experience, and Internet of Things access efficiency is improved to some extent.

The following describes, in detail, implementations of the present disclosure with reference to the accompanying drawings.

Embodiment 1

Figure 1:
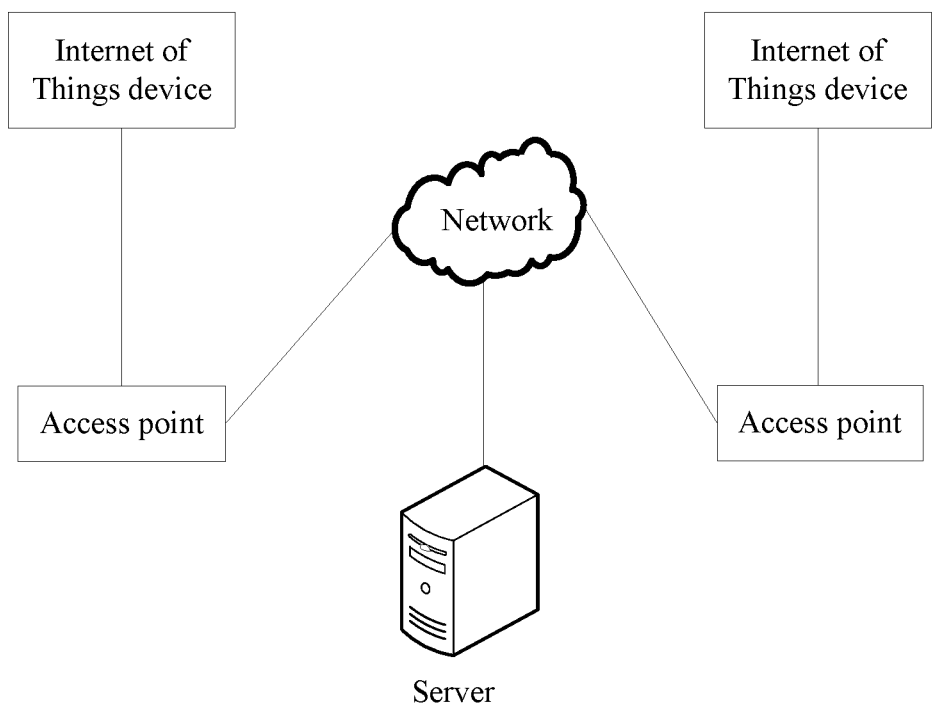
FIG. 1 is a schematic diagram of an Internet of Things according to an embodiment of the present disclosure.

This embodiment of the present disclosure provides a schematic diagram of an Internet of Things. As shown in FIG. 1, the Internet of Things includes an Internet of Things device, an access point, a server, and a network. The Internet of Things device is connected to the access point, the access point is connected to the network, and the server is connected to the network. The Internet of Things device may be a controller, a sensor, a camera, or a switch, a television, a washing machine, an electric cooker, or the like used in a user's life. The access point may be a router. The server may be a large computer. The network may be an Internet Protocol (IP) network, and includes transmission devices such as a router and a switch, which are configured to transmit a message between Internet of Things devices, or a message between a server and an access point. The network may be a transmission network in another form. This is not limited herein in the present disclosure.

Figure 2:
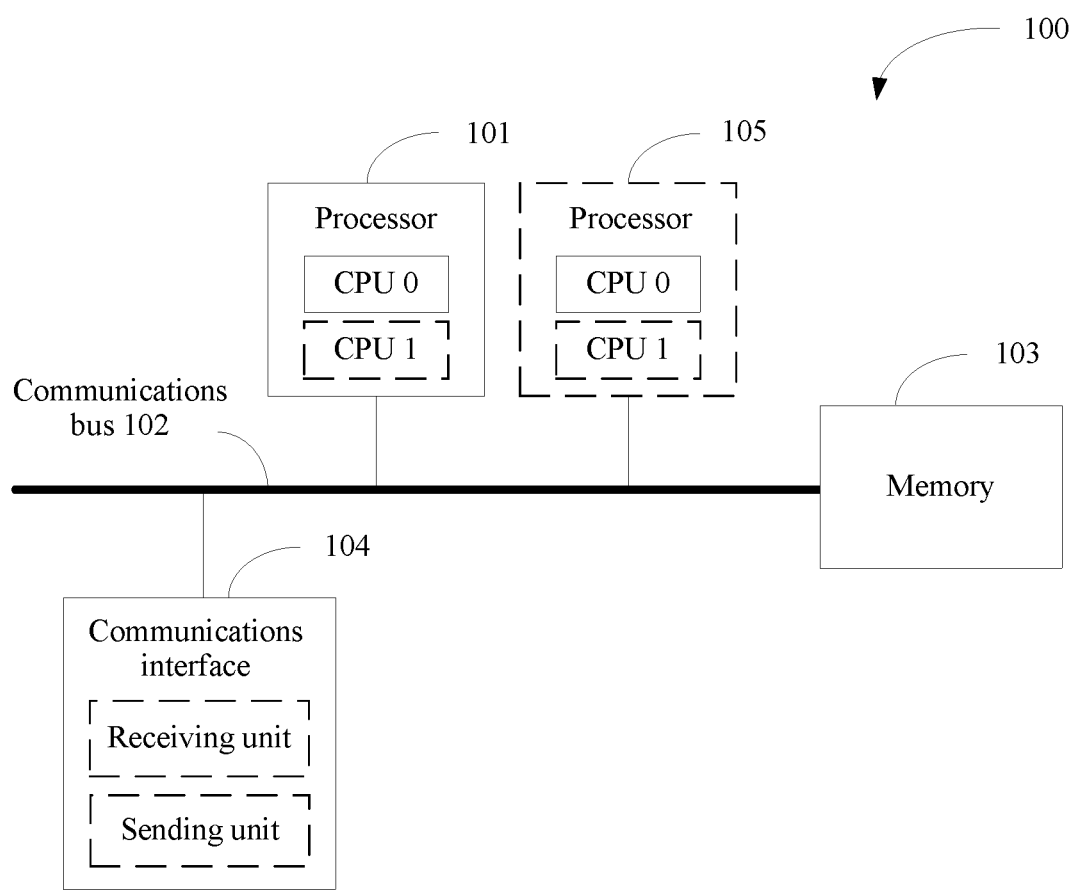
FIG. 2 is a schematic structural diagram of hardware of a computer according to an embodiment of the present disclosure.

As shown in FIG. 2, the Internet of Things device and the access point in FIG. 1 may be implemented in a form of a computer device (or a system) in FIG. 2.

FIG. 2 shows a schematic diagram of the computer device according to this embodiment of the present disclosure. A computer device 100 includes at least one processor 101, a communications bus 102, a memory 103, and at least one communications interface 104.

The processor 101 may be a processor, or may be a general term for multiple processing elements. For example, the processor 101 may be a general-purpose central processing unit (CPU), or may be an application-specific integrated circuit (ASIC), or one or more integrated circuits configured to control execution of solution programs in the present disclosure, for example, one or more microprocessors (microcontroller (MCU)), or one or more field programmable gate arrays (FPGAs).

In specific implementation, in an embodiment, the processor 101 may include one or more CPUs, such as a CPU 0 and a CPU 1 in FIG. 2.

In specific implementation, in an embodiment, the computer device 100 may include multiple processors, such as the processor 101 and a processor 105 in FIG. 2. Each of these processors may be a single-core (single-CPU) processor or a multi-core (multi-CPU) processor. The processor 101, 105 herein may refer to one or more devices, circuits, and/or processing cores configured to process data (for example, a computer program instruction).

The communications bus 102 may be an industry standard architecture (ISA) bus, a Peripheral Component Interconnect (PCI) bus, an extended ISA (EISA) bus, or the like. The communications bus 102 may be classified into an address bus, a data bus, a control bus, and the like. For ease of representation, only one bold line is used in FIG. 2 to represent the communications bus 102, but it does not represent that there is only one bus or one type of bus.

The memory 103 may be a read-only memory (ROM), a static storage device of another type that can store static information and an instruction, a random access memory (RAM), or a dynamic storage device of another type that can store information and an instruction, or may be an electrically erasable programmable ROM (EEPROM), a compact disc ROM (CD-ROM), other compact disc storage, optical disc storage (including a compact disc, a laser disc, an optical disc, a digital versatile disc, a BLU-RAY disc, and the like), a disk storage medium, another disk storage device, or any other medium that can be used to carry or store expected program code in a form of an instruction or a data structure and that can be accessed by a computer. However, this is not limited herein. The memory may exist independently, and be connected to the processor using the bus. The memory may be integrated with the processor.

The memory 103 is configured to store application program code used to implement solutions provided in this embodiment of the present disclosure, and the application program code is controlled and executed by the processor 101. The processor 101 is configured to execute the application program code stored in the memory 103 in order to implement the solutions provided in this embodiment of the present disclosure.

The communications interface 104, using any apparatus of a transceiver type, is configured to communicate with another device or a communications network, such as an Ethernet, a radio access network (RAN), or a wireless local area network (WLAN). The communications interface 104 may include a receiving unit to implement a receiving function, and a sending unit to implement a sending function.

In specific implementation, in an embodiment, the computer device 100 shown in FIG. 2 may be the access point in FIG. 1.

The communications interface 104 is configured to receive an access request message that is sent by an Internet of Things device and that includes a UUID, an SSID, and a first pass_tmp.

The communications interface 104 is further configured to obtain a second pass_tmp from a server.

The communications interface 104 is further configured to send an access response message that includes the SSID and a password to the Internet of Things device.

The communications interface 104 is further configured to send a verification message that includes the UUID to the server.

The communications interface 104 is further configured to receive a verification response message that includes the second pass_tmp and that is sent by the server.

The processor 101 is configured to generate a second prompt message used to prompt a user that the Internet of Things device requests to access a network when that the first pass_tmp is the same as the second pass_tmp.

The memory 103 is configured to store the SSID and the password.

In specific implementation, in an embodiment, the computer device 100 shown in FIG. 2 may be the Internet of Things device shown in FIG. 1.

The communications interface 104 is configured to send an access request message that includes a UUID, an SSID, and a first pass_tmp to an access point.

The communications interface 104 is further configured to receive an access response message that includes the SSID and a password and that is sent by the access point.

The processor 101 is configured to access a network using the SSID and the password.

The memory 103 is configured to store the SSID and the password.

Embodiment 2

Figure 3:
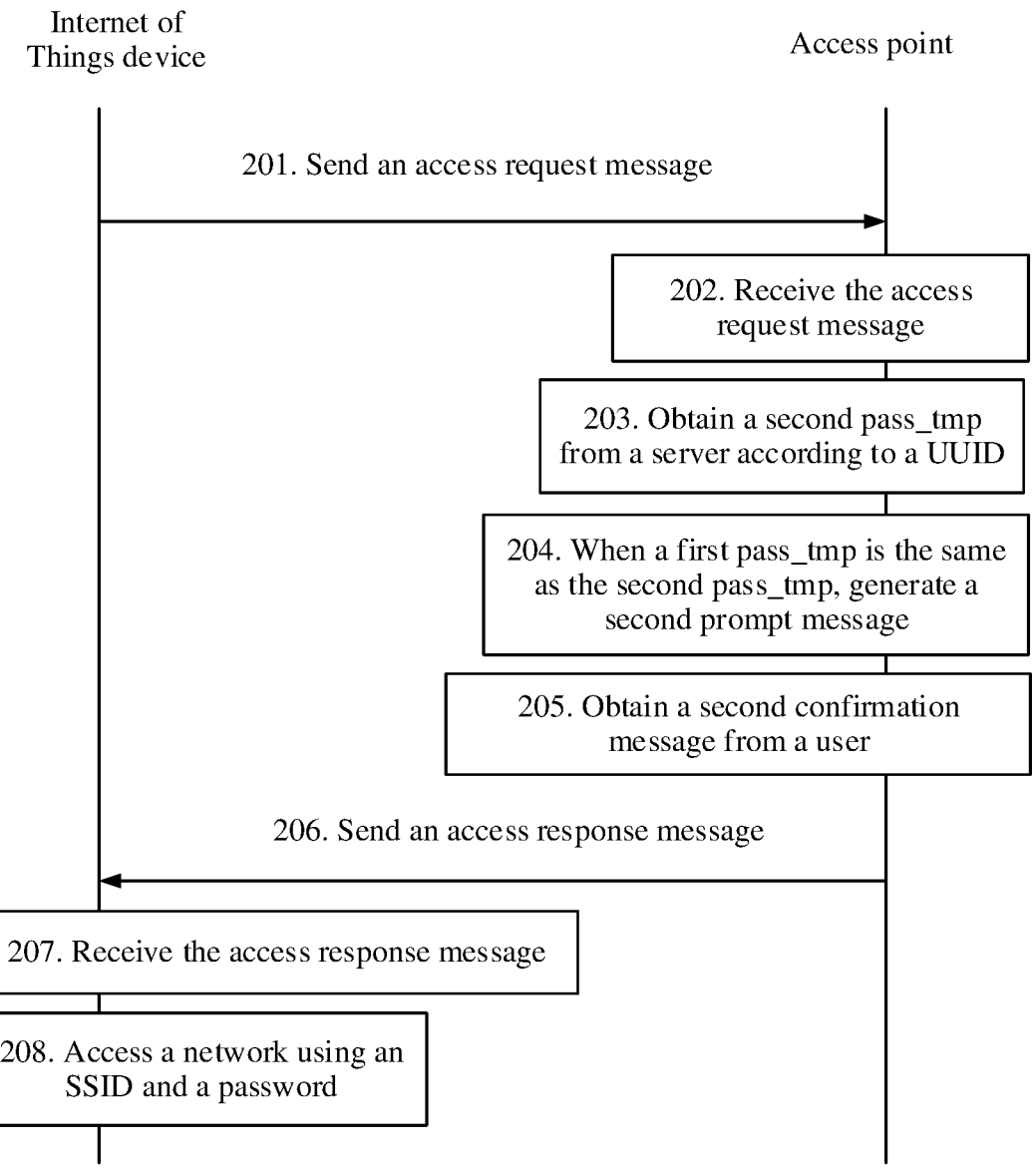
FIG. 3 is a flowchart of a method for accessing a network by an Internet of Things device according to an embodiment of the present disclosure.

This embodiment of the present disclosure provides a method for accessing a network by an Internet of Things device. As shown in FIG. 3, the method includes the following steps.

Step 201: An Internet of Things device sends an access request message to an access point according to an SSID.

The SSID is used to indicate a name of a wireless local area network deployed by the access point, and the Internet of Things device may send the access request message to the access point according to the SSID. The access request message includes a UUID, the SSID, and a first pass_tmp. The UUID is used to uniquely identify the Internet of Things device. The first pass_tmp is used by the access point to send an access response message to the Internet of Things device when that the first pass_tmp is the same as a second pass_tmp that is obtained by the access point from a server according to the UUID.

Step 202: The access point receives the access request message sent by the Internet of Things device.

The name of the wireless local area network deployed by the access point is the SSID, and the access point receives the access request message that includes the SSID. The access request message further includes the UUID and the first pass_tmp.

Step 203: The access point obtains a second pass_tmp from a server according to a UUID.

Step 204: When a first pass_tmp is the same as the second pass_tmp, the access point generates a second prompt message.

The second prompt message is used to prompt a user that the access point needs to send the access response message to the Internet of Things device. For example, the access point may be provided with a screen, and the screen displays a first prompt message. Alternatively, the access point may be provided with an indicator, and it may be set that different colors indicated by the indictor represent different messages.

Step 205: The access point obtains a second confirmation message from a user.

The second confirmation message is used to indicate that the access point is allowed to send the access response message to the Internet of Things device. For example, the access point may be provided with a physical confirmation key, or a touchscreen displays a virtual confirmation key. The user touches the confirmation key, the access point obtains the second confirmation message, and the access point sends the access response message that includes the SSID and a password to the Internet of Things device.

Step 206: The access point sends an access response message to the Internet of Things device according to the second confirmation message from the user and the UUID.

The UUID is used to uniquely identify the Internet of Things device. The access point sends the access response message to the Internet of Things device indicated by the UUID. The access response message includes the UUID, the SSID, and the password.

Step 207: The Internet of Things device receives the access response message sent by the access point.

The Internet of Things device receives, according to the UUID, the access response message that includes the UUID. The access response message further includes the SSID and the password.

Step 208: The Internet of Things device accesses a network using the SSID and a password.

It should be noted that the Internet of Things device may store the SSID and the password.

In this way, an Internet of Things device sends a UUID, an SSID, and a first pass_tmp to an access point, when the first pass_tmp is the same as a second pass_tmp that is obtained by the access point from a server according to the UUID, the access point sends the SSID and a password to the Internet of Things device, and the Internet of Things device accesses a network using the SSID and the password. A user does not need to notify the Internet of Things device of the SSID and the password. Therefore, when it is ensured that the Internet of Things device securely accesses the network, not only hardware apparatuses that need to be provided for the Internet of Things device can be reduced to reduce costs of the Internet of Things device, but also operation steps of the user can be reduced to reduce complexity of a user operation such that the user has better user experience, and Internet of Things access efficiency is improved to some extent.

The method steps shown in FIG. 3 may be further implemented by the computer device shown in FIG. 2. For example, step 201 of sending an access request message, step 206 of sending an access response message, and another method step of sending or receiving may be all implemented by the communications interface 104. Step 204 may be implemented by the processor 101.

Figure 4:
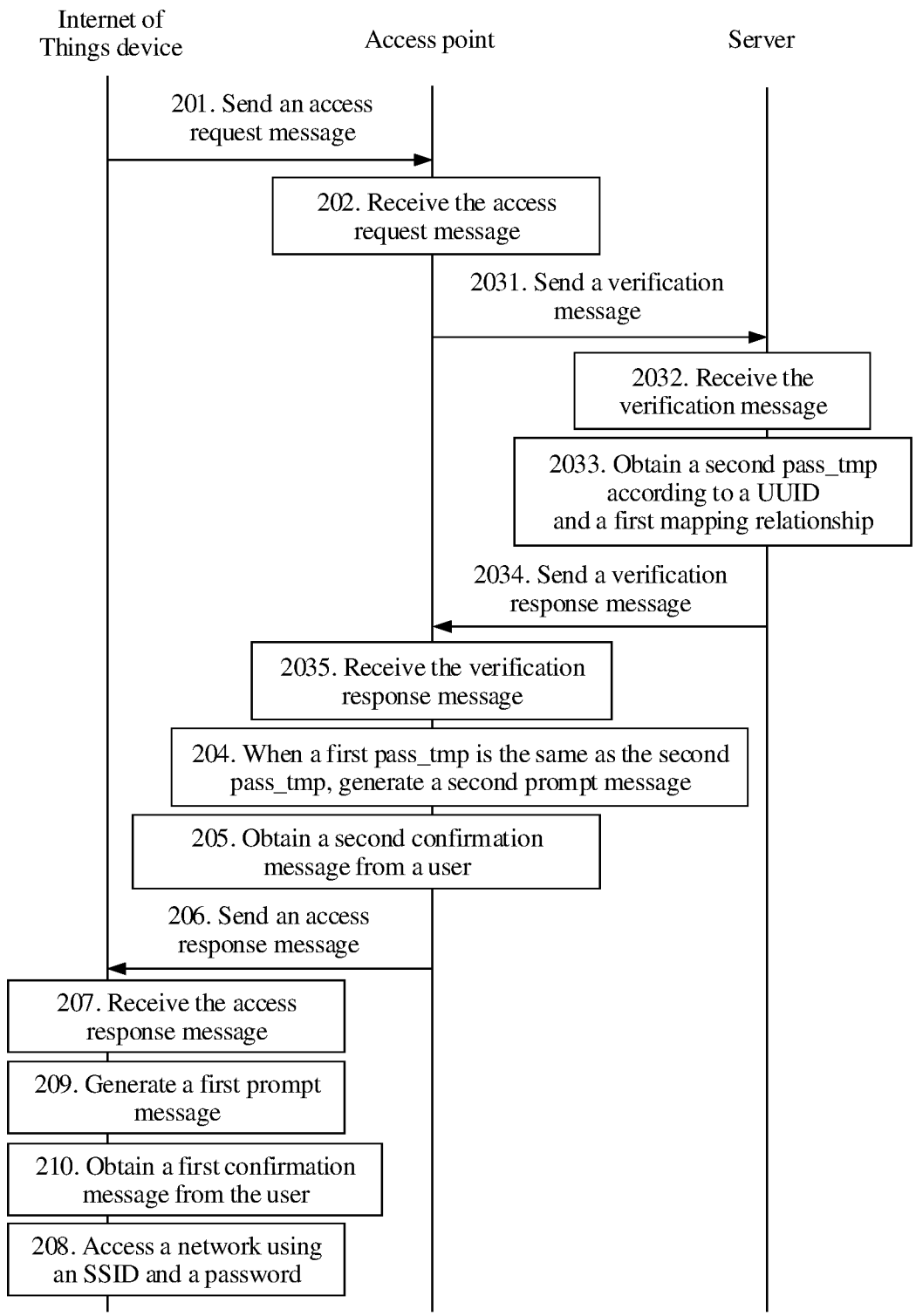
FIG. 4 is a flowchart of another method for accessing a network by an Internet of Things device according to an embodiment of the present disclosure.

Further, as shown in FIG. 4, before the Internet of Things device accesses the network using the SSID and the password, for example, before step 208, the Internet of Things device may not access the network until permission is granted by the user. Further, the following steps are further included.

Step 209: The Internet of Things device generates a first prompt message.

The first prompt message is used to prompt the user that the Internet of Things device needs to access the network. For example, the Internet of Things device may be provided with a screen, and the screen displays the first prompt message. Alternatively, the Internet of Things device may be provided with an indicator, and it may be set that different colors indicated by the indicator represent different messages.

Step 210: The Internet of Things device obtains a first confirmation message from the user.

The Internet of Things device accesses the network according to the first confirmation message from the user and using the SSID and the password. The first confirmation message is used to indicate that the Internet of Things device is allowed to access the network. For example, the Internet of Things device may be provided with a physical confirmation key, or a touchscreen displays a virtual confirmation key. The user touches the confirmation key, the Internet of Things device obtains the first confirmation message, and the Internet of Things device accesses the network using the SSID and the password.

In step 203, obtaining, by the access point, a second pass_tmp from a server according to a UUID may further include the following steps.

Step 2031: The access point sends a verification message to the server.

The verification message includes the UUID.

Step 2032: The server receives the verification message sent by the access point.

The verification message includes the UUID. The UUID is used to uniquely identify the Internet of Things device.

Step 2033: The server obtains the second pass_tmp according to the UUID and a first mapping relationship.

The first mapping relationship includes a mapping from the UUID to the second pass_tmp.

Step 2034: The server sends a verification response message to the access point.

The verification response message includes the second pass_tmp.

Step 2035: The access point receives the verification response message sent by the server.

The verification response message includes the second pass_tmp. The server stores at least one UUID and a pass_tmp corresponding to the UUID.

The method steps shown in FIG. 4 may be further implemented by the computer device shown in FIG. 2. For example, step 2031 of sending a verification message, step 2032 of receiving the verification message, and another method step of sending or receiving may be all implemented by the communications interface 104. Step 209 of generating a first prompt message may be implemented by the processor 101.

It should be noted that a message between the Internet of Things device, the access point, and the server in this embodiment of the present disclosure may be transmitted in a message format stipulated in the Transmission Control Protocol (TCP)/IP.

"First" and "second" described in this embodiment of the present disclosure do not represent a sequence, and are merely used for distinction, for example, the first prompt message and the second prompt message are merely two different prompt messages.

Embodiment 3

Figure 5:
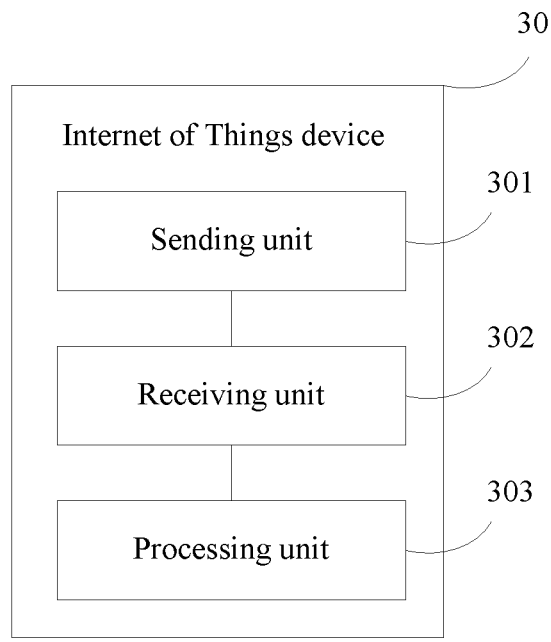
FIG. 5 is a schematic structural diagram of an Internet of Things device according to an embodiment of the present disclosure.

This embodiment of the present disclosure provides an Internet of Things device 30. As shown in FIG. 5, the Internet of Things device 30 includes a sending unit 301 configured to send an access request message to an access point according to an SSID, where the access request message includes a UUID, the SSID, and a first pass_tmp, the UUID is used to uniquely identify the Internet of Things device 30, and the first pass_tmp is used by the access point to send an access response message to the Internet of Things device 30 when the first pass_tmp is the same as a second pass_tmp that is obtained by the access point from a server according to the UUID, a receiving unit 302 configured to receive the access response message sent by the access point, where the access response message includes the SSID and a password, and a processing unit 303 configured to access a network using the SSID and the password.

In this way, an Internet of Things device sends a UUID, an SSID, and a first pass_tmp to an access point, when the first pass_tmp is the same as a second pass_tmp that is obtained by the access point from a server according to the UUID, the access point sends the SSID and a password to the Internet of Things device, and the Internet of Things device accesses a network using the SSID and the password. A user does not need to notify the Internet of Things device of the SSID and the password. Therefore, when it is ensured that the Internet of Things device securely accesses the network, not only hardware apparatuses that need to be provided for the Internet of Things device can be reduced to reduce costs of the Internet of Things device, but also operation steps of the user can be reduced to reduce complexity of a user operation such that the user has better user experience, and Internet of Things access efficiency is improved to some extent.

In this embodiment, the Internet of Things device 30 is presented in a form of a functional unit. The "unit" herein may refer to an ASIC, a circuit, a processor configured to execute one or more software or firmware programs, and a memory, an integrated logic circuit, and/or another device that can provide the foregoing functions. In a simple embodiment, a person skilled in the art may figure out that the Internet of Things device 30 may use a form shown in FIG. 5. The sending unit 301, the receiving unit 302, and the processing unit 303 may be implemented by the computer device in FIG. 2. Further, the sending unit 301 and the receiving unit 302 may be implemented by the communications interface 104, and the processing unit 303 may be implemented by the processor 101.

Embodiment 4

Figure 6:
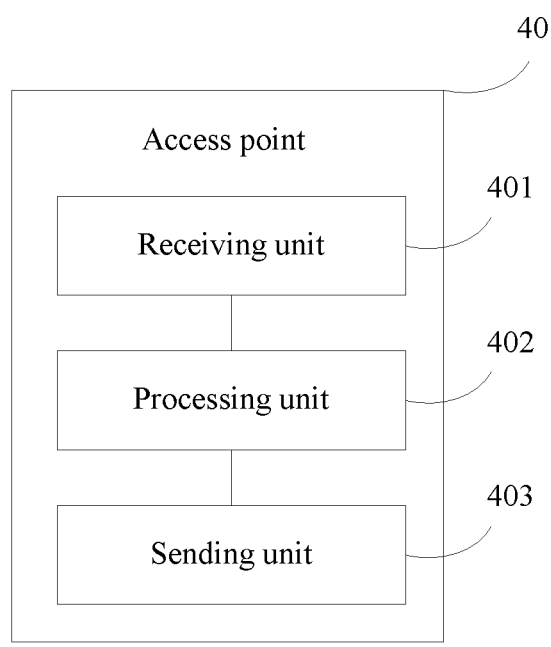
FIG. 6 is a schematic structural diagram of an access point according to an embodiment of the present disclosure.

This embodiment of the present disclosure provides an access point 40. As shown in FIG. 6, the access point 40 includes a receiving unit 401 configured to receive an access request message sent by an Internet of Things device, where the access request message includes a UUID, an SSID, and a first pass_tmp, and the UUID is used to uniquely identify the Internet of Things device, where the receiving unit 401 is further configured to obtain a second pass_tmp from a server according to the UUID, a processing unit 402 configured to when the first pass_tmp is the same as the second pass_tmp, generate a second prompt message, where the second prompt message is used to prompt a user that the access point 40 needs to send an access response message to the Internet of Things device, where the receiving unit 401 is further configured to obtain a second confirmation message from the user, where the second confirmation message is used to indicate that the access point 40 is allowed to send the access response message to the Internet of Things device, and a sending unit 403 configured to send the access response message to the Internet of Things device according to the second confirmation message from the user and the UUID, where the access response message includes the UUID, the SSID, and a password, and the password is used by the Internet of Things device to access the access point 40.

In this embodiment, the access point 40 is presented in a form of a functional unit. The "unit" herein may refer to an ASIC, a circuit, a processor configured to execute one or more software or firmware programs, and a memory, an integrated logic circuit, and/or another device that can provide the foregoing functions. In a simple embodiment, a person skilled in the art may figure out that the access point 40 may use a form shown in FIG. 6. The receiving unit 401, the processing unit 402, and the sending unit 403 may be implemented by the computer device in FIG. 2. Further, the sending unit 403 and the receiving unit 401 may be implemented by the communications interface 104, and the processing unit 402 may be implemented by the processor 101.

Embodiment 5

Figure 7:
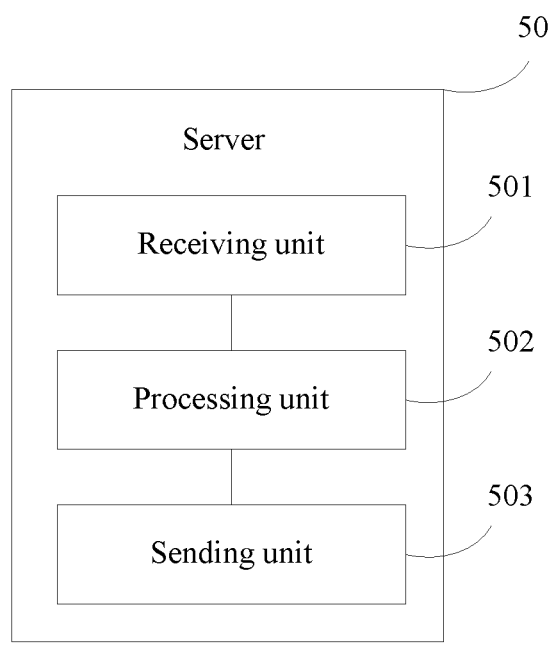
FIG. 7 is a schematic structural diagram of a server according to an embodiment of the present disclosure.

This embodiment of the present disclosure provides a server 50. As shown in FIG. 7, the server 50 includes a receiving unit 501 configured to receive a UUID sent by an access point, where the UUID is used to uniquely identify an Internet of Things device, a processing unit 502 configured to obtain a pass_tmp according to the UUID and a first mapping relationship, where the first mapping relationship includes a mapping from the UUID to the pass_tmp, and a sending unit 503, further configured to send the pass_tmp to the access point.

In this embodiment, the server 50 is presented in a form of a functional unit. The "unit" herein may refer to an ASIC, a circuit, a processor configured to execute one or more software or firmware programs, and a memory, an integrated logic circuit, and/or another device that can provide the foregoing functions. In a simple embodiment, a person skilled in the art may figure out that the server 50 may use a form shown in FIG. 7. The receiving unit 501, the processing unit 502, and the sending unit 503 may be implemented by the computer device in FIG. 2. Further, the sending unit 503 and the receiving unit 501 may be implemented by the communications interface 104, and the processing unit 502 may be implemented by the processor 101.

This embodiment of the present disclosure further provides a computer storage medium, which is configured to store a computer software instruction used by the Internet of Things device shown in FIG. 5. The computer software instruction includes a program designed for executing the method embodiment. An SSID and a password may be obtained by executing the stored program.

This embodiment of the present disclosure further provides a computer storage medium, which is configured to store a computer software instruction used by the access point shown in FIG. 6. The computer software instruction includes a program designed for executing the method embodiment. An SSID and a password may be obtained by executing the stored program.

This embodiment of the present disclosure further provides a computer storage medium, which is configured to store a computer software instruction used by the server 50 shown in FIG. 7. The computer software instruction includes a program designed for executing the method embodiment. An SSID and a password may be obtained by executing the stored program.

The method described in the embodiments of the present disclosure may be applied to the field of Internet of Things, or may be applied to another field in which a device accesses a network, such as a wireless sensor network (WSN).

It may be clearly understood by a person skilled in the art that, for the purpose of convenient and brief description, for a detailed working process of the foregoing apparatus and unit, reference may be made to a corresponding process in the foregoing method embodiments, and details are not described herein again. In addition, functional units in the embodiments of the present disclosure may be integrated into one processing unit, or each of the units may exist alone physically, or two or more units may be integrated into one unit. The foregoing integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The foregoing program may be stored in a computer readable storage medium. When the program runs, the steps of the method embodiments are performed. The foregoing storage medium includes any medium that may store program code, such as a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for accessing a network by an Internet of Things device, comprising:
    receiving, by an access point, an access request message from the Internet of Things device, wherein the access request message comprises a universally unique identifier (UUID), a service set identifier (SSID), and a first temporary password (pass_tmp), and wherein the UUID uniquely identifies the Internet of Things device;
    obtaining, by the access point, a second pass_tmp from a server according to the UUID;
    generating, by the access point, a first prompt message when the first pass_tmp is the same as the second pass_tmp, wherein the first prompt message prompts a user that the access point needs to send an access response message to the Internet of Things device;
    obtaining, by the access point, a first confirmation message from the user, wherein the first confirmation message indicates that the access point is allowed to send the access response message to the Internet of Things device;
    sending, by the access point, the access response message to the Internet of Things device according to the first confirmation message from the user and the UUID, wherein the access response message comprises the UUID, the SSID, and a password, and wherein the password is used by the Internet of Things device to access the access point;
    receiving, by the Internet of Things device, the access response message from the access point; and
    accessing, by the Internet of Things device, a network using the SSID and the password in the access response message.

2. The method of claim 1, wherein obtaining the second pass_tmp from the server comprises:
    sending, by the access point, a verification message to the server, wherein the verification message comprises the UUID; and
    receiving, by the access point, a verification response message from the server, wherein the verification response message comprises the second pass_tmp, and wherein the server stores at least one UUID and a pass_tmp corresponding to each UUID.

3. The method of claim 1, wherein obtaining the second pass_tmp from the server further comprises obtaining the second pass_tmp from the server according to the UUID and a mapping relationship, and wherein the mapping relationship comprises a mapping from the UUID to the second pass_tmp.

4. The method of claim 1, wherein before accessing the network using the SSID and the password, the method further comprises:
    generating, by the Internet of Things device, a second prompt message, wherein the second prompt message prompts the user that the Internet of Things device needs to access the network; and
    obtaining, by the Internet of Things device, a second confirmation message from the user, wherein the second confirmation message indicates that the Internet of Things device is allowed to access the network.

5. The method of claim 1, wherein the access point comprises a screen.

6. The method of claim 5, wherein the screen is configured to display the first prompt message.

7. The method of claim 1, wherein the access point comprises an indicator.

8. The method of claim 7, wherein the indicator is configured to indicate different messages using different colors.

9. The method of claim 1, wherein the access point comprises a physical confirmation key or a virtual confirmation key.

10. The method of claim 9, wherein the access point obtains the second confirmation message when the user touches the physical confirmation key or the virtual confirmation key.

11. An access point comprising:
    a receiver configured to:
        receive an access request message sent by an Internet of Things device, wherein the access request message comprises a universally unique identifier (UUID), a service set identifier (SSID), and a first temporary password (pass_tmp), and wherein the UUID uniquely identifies the Internet of Things device; and
        obtain a second pass_tmp from a server according to the UUID;
    a processor coupled to the receiver and configured to generate a first prompt message when the first pass_tmp is the same as the second pass_tmp, wherein the first prompt message prompts a user that the access point needs to send an access response message to the Internet of Things device,
    wherein the receiver is further configured to obtain a first confirmation message from the user, and wherein the first confirmation message indicates that the access point is allowed to send the access response message to the Internet of Things device; and
    a transmitter coupled to the receiver and the processor and configured to send the access response message to the Internet of Things device according to the first confirmation message from the user and the UUID, wherein the access response message comprises the UUID, the SSID, and a password, wherein the password is used by the Internet of Things device to access the access point, and wherein a network is accessed by the Internet of Things device using the SSID and the password in the access response message.

12. The access point of claim 11, wherein in a manner to obtain the second pass_tmp from the server, the receiver is further configured to:
    send a verification message to the server, wherein the verification message comprises the UUID; and
    receive a verification response message from the server, wherein the verification response message comprises the second pass_tmp, and wherein the server stores at least one UUID and a pass_tmp corresponding to each UUID.

13. The access point of claim 11, wherein in a manner to obtain the second pass_tmp from the server, the receiver is further configured to obtain the second pass_tmp from the server according to the UUID and a mapping relationship, and wherein the mapping relationship comprises a mapping from the UUID to the second pass_tmp.

14. The access point of claim 11, wherein the access point comprises a screen.

15. The access point of claim 14, wherein the screen is configured to display the first prompt message.

16. The access point of claim 11, wherein the access point comprises an indicator.

17. The access point of claim 16, wherein the indicator is configured to indicate different messages using different colors.

18. The access point of claim 11, wherein the access point comprises a physical confirmation key or a virtual confirmation key.

19. The access point of claim 18, wherein the access point obtains the first confirmation message when the user touches the physical confirmation key or the virtual confirmation key.

\* \* \* \* \*